(12) United States Patent
Fuchs

(10) Patent No.: US 10,928,926 B2
(45) Date of Patent: Feb. 23, 2021

(54) SOFTWARE-INDEPENDENT SHORTCUTS

(71) Applicant: SAP SE, Walldorf (DE)

(72) Inventor: Swen Fuchs, Schwetzingen (DE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 16/126,131

(22) Filed: Sep. 10, 2018

(65) Prior Publication Data
US 2020/0081550 A1 Mar. 12, 2020

(51) Int. Cl.
| | |
|---|---|
| *G06F 3/023* | (2006.01) |
| *G06F 3/0482* | (2013.01) |
| *G06F 3/0488* | (2013.01) |
| *G06F 3/02* | (2006.01) |

(52) U.S. Cl.
CPC .......... *G06F 3/0238* (2013.01); *G06F 3/0219* (2013.01); *G06F 3/0482* (2013.01); *G06F 3/04886* (2013.01)

(58) Field of Classification Search
CPC .... G06F 3/0238; G06F 3/0219; G06F 3/0482; G06F 3/04886
See application file for complete search history.

(56) References Cited

U.S. PATENT DOCUMENTS

| | | | | |
|---|---|---|---|---|
| 2006/0026572 A1* | 2/2006 | Srivastava | .......... | G06F 9/45512 717/136 |
| 2014/0372896 A1* | 12/2014 | Raman | .................. | G06F 3/0488 715/741 |
| 2015/0347005 A1* | 12/2015 | Hou | .................... | G06F 3/04842 715/773 |
| 2017/0285886 A1* | 10/2017 | Klima | .................. | G06F 3/0482 |

* cited by examiner

*Primary Examiner* — Patrick N Edouard
*Assistant Examiner* — Eboni N Giles
(74) *Attorney, Agent, or Firm* — Buckley, Maschoff & Talwalkar LLC

(57) ABSTRACT

Provided is a method and system for defining shortcuts that can be used across multiple different software tools. In one example, the method may include detecting a key press, via a keyboard, associated with a command, identifying an application-independent shortcut corresponding to the key press, translating the application-independent shortcut into an application-specific shortcut for performing the command within the application, based on a translation database, and transmitting the application-specific shortcut to the application in response to the detected key press.

19 Claims, 5 Drawing Sheets

SOFTWARE-INDEPENDENT SHORTCUTS

BACKGROUND

Computer keyboard shortcuts refer to keyboard input (combination of key presses) which generates an instruction or a command to the computer. Often keyboard shortcuts are used for inputting information into a software application or other tool executing on the computer in place of using a mouse or other input device. Keyboard shortcuts can be generated by a user pressing a combination of keys on a keyboard in sequence or simultaneously. One example of a keyboard shortcut is the control key (CTRL) and the 'S' key being pressed at the same time which generates an instruction for saving a file to disk. Often, when a user is operating on a file their hands are already positioned on the keyboard. Here, the shortcut (CTRL+S) alleviates the user from having to move their focus away from the keyboard and use a mouse and a cursor to interact with a file menu to save the file which can require multiple mouse clicks and scrolls through a drop-down menu. In this way, a user can more conveniently and efficiently save a file using two fingers pressing the keyboard at the same time. For users (e.g., developers, programmers, typists, designers, engineers, writers, etc.) knowing keyboard shortcuts can significantly improve efficiency when generating documents and other content via a computer.

However, computer keyboard shortcuts are not standardized. In other words, there is no universal list or common set of computer shortcuts. Rather, shortcuts are controlled and set individually by software tools. Different software applications, development interfaces, and the like, often have their own set of shortcuts. As a result, in order to execute a same command (e.g., save, open, close, refresh, etc.) in two different software applications, a user is often required to use different shortcuts. As a result, the user must remember different keyboard shortcuts for different software tools. However, memorizing different keyboard shortcuts across different software tools can be difficult especially for users that interact with significant amounts of software on a regular basis. As a result, a user may forget shortcuts or incorrectly mix shortcuts that aren't appropriate for a specific software tool. Therefore, what is needed is an improved mechanism for implementing and maintaining keyboard shortcuts across different software tools.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
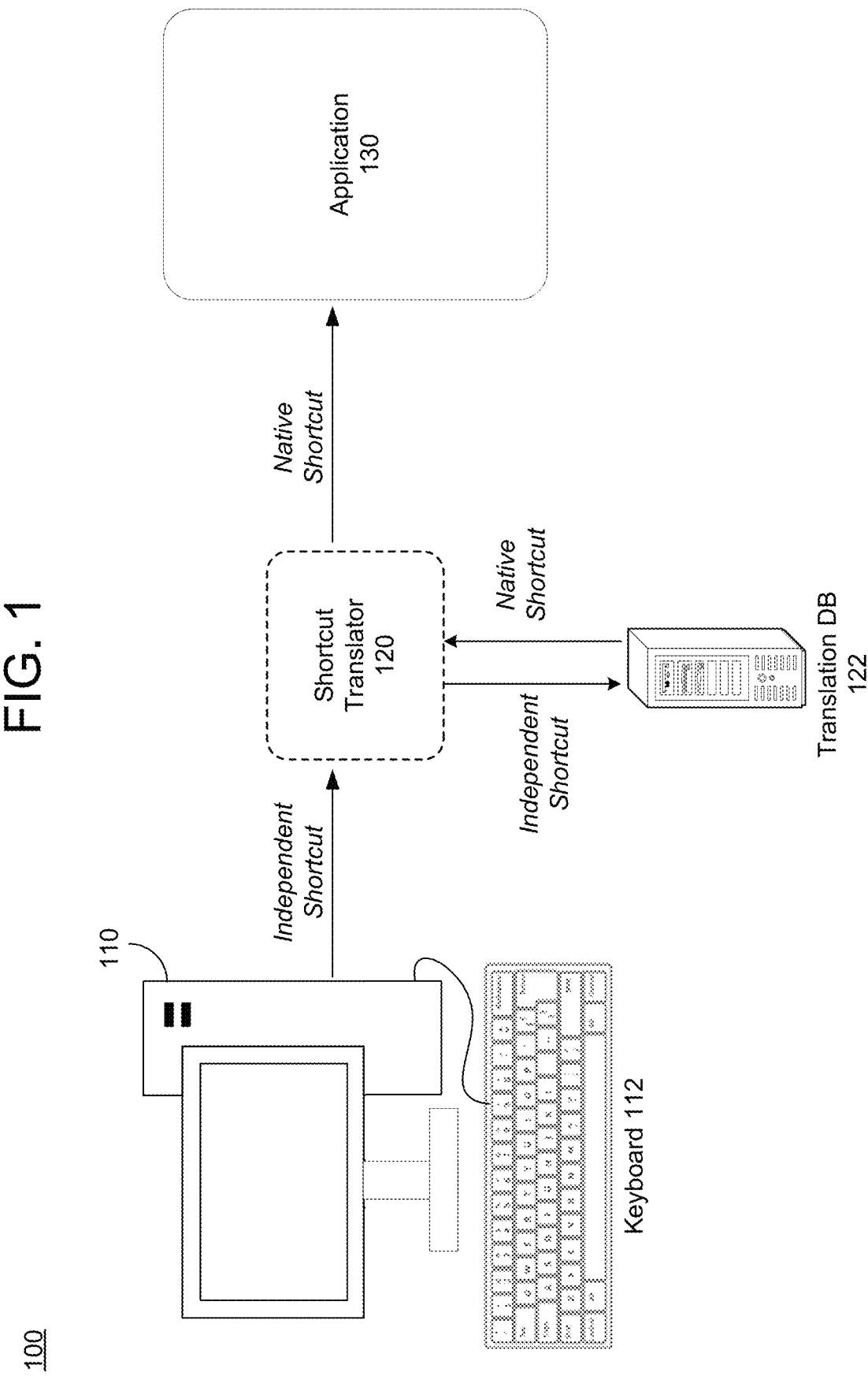
FIG. 1 is a diagram illustrating a computing environment for implementing application-independent keyboard shortcuts in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments overcome the drawbacks of traditional computer keyboard shortcuts by implementing application-independent keyboard shortcuts which can be used for inputting commands on a global scale regardless of the application or software tool where the command is being input. A translation software program may be installed on a user device independent from the software applications where the user is inputting data. The translation program can intercept keyboard inputs that represent application-independent shortcuts which may be generated by a user, and translate them into application-specific shortcuts which are native to the respective applications, based on a database of mapping information. Here, the program may translate a generic keyboard shortcut into any of a plurality of different shortcut formats depending on a software application/tool where the shortcut is being input. That is, the translation program can translate a keyboard shortcut that is not based on any specific application into a shortcut that is native or otherwise understood by any application on the user's computing system. As a result, a user does not need to memorize different sets of keyboard shortcuts for different software tools but may use one set of keyboard shortcuts that can be translated and used with many different software tools.

Users of computers and software programs executing therein may save time by using keyboard shortcuts for entering commands instead of making multiple selections through various menus of a software program. Shortcuts are the simultaneous pressing of multiple keys on a computer keyboard or sequential pressing of multiple keys on a computer keyboard in a specific order to generate a command. Through the use of shortcuts, a user such as a software developer, an administrator, or anyone who regularly uses a computer, can result in a significant time savings, and is important in recurring work. Unfortunately, an operating system independent universal standard for shortcuts does not exist. Instead, it is up to the developers of the above-mentioned tools to define the shortcuts for a specific software program (e.g., application, IDE, etc.) This ultimately requires a user who uses a variety of tools on a regular basis to remember different keyboard shortcuts across different software programs. As a result users may forget shortcuts or mix-up key combinations, which in turn can produce negative effects.

The translation program may recognize, validate, translate, and pass keyboard shortcuts to a target application. The program may act as a translator between input keys selected by a user and input keys which are provided to the application. According to various embodiments, the translation program may provide the user with an interface for defining application-independent shortcuts that are not tied to a particular software application. Here, the user can select a command and define a specific keyboard shortcut for the command. This can be done for any desired amount of commands at the preference of the user. Furthermore, the translation program can store a mapping between the user-defined shortcuts and corresponding shortcuts for a plurality of different software applications. When a keyboard shortcut command is received, the translation program may identify the application where the command is being input, translate the command from an application-independent shortcut (e.g., defined by the user, default, etc.), into the native application shortcut of the application, and pass the translated command to the application. Therefore, a user only needs to remember and execute a single shortcut command for all applications for a specific action (e.g. saving a file, cutting content, pasting content, opening, etc.) The translation program is application independent. This means that it is not an extension to an application, but is a stand-alone tool.

FIG. 1 illustrates a computing environment 100 for implementing application-independent keyboard shortcuts in accordance with an example embodiment. The computing environment 100 may be performed via a single computing system or via multiple computing systems. Referring to FIG. 1, a user system 110 interacts with an application 130. The user system 110 may include a computer such as a desktop personal computer (PC), a laptop, a server, or the like. As another example, the user system 110 may be a mobile phone, a tablet, a smart-wearable device, or the like. In this example, the application 130 may be an application that is executing/hosted on the user system 110. However, embodiments are not limited to the application being hosted on the user system but instead may be an application that is hosted by a remote system (e.g., web server) and accessed via a network (e.g., Internet, private network, etc.) in the case of a web-based application, email application, etc.

The user system 110 also includes a keyboard 112 which may be attached to the user system 110 via a cable or via a wireless connection such as Bluetooth, etc. Although shown as a mechanical keyboard, the keyboard 112 may instead be a virtual keyboard that is displayed via a screen or interface of a monitor of the user system 110 or associated with the user system 110. During operation, a user may press keys on the keyboard 112 to enter commands, instructions, and the like, into the application 130. The commands may be used to control content being entered into or retrieved from the application. As another example, the commands may be used to control operation of the application such as opening/closing of files, refreshing the screen, saving bookmarks, cutting, pasting, deleting, and the like.

According to various embodiments, a user of the user system 110 may define their own unique set of keyboard shortcuts that are independent of the software tool (e.g., application 130) where the commands are being input. In other words, the keyboard shortcuts may be application-agnostic. A user may define the keyboard shortcuts they want to use on a global basis via a user interface that is associated with the shortcut translator 120. As another example, a default set of keyboard shortcuts can be implemented without a user defining them. When a key press occurs, the shortcut translator 120 may detect that the key press corresponds to a defined application-independent keyboard shortcut, and convert the independent keyboard shortcut into a native shortcut for the application 130. Here, the shortcut translator 120 may access a translation database 122 such as global DB to perform the translation. The translation database 122 may store a mapping, for example, in tables, rows, columns, etc. between application-independent shortcuts defined for the user system 110 and application-specific shortcuts for multiple applications.

The shortcut translator 120 may include a software program that is installed and executing on the user system 110. According to various embodiments, the shortcut translator 120 may be a software program that is independent of the application 130. In other words, the shortcut translator 120 may not be an extension of the application 130 but may be a stand-alone tool. However, the shortcut translator 120 is not limited to this specific implementation. The shortcut translator 120 may be embodied in any software form that is convenient for a system.

In some embodiments, the translation database 122 may be a global database of data records that are accessed via a network connection and hosted by a web server that is remote from the user system 110. The translation database 122 may be updated on the back-end to include new shortcuts of newly added applications, without requiring changes to be made to the shortcut translator 120 on the user system 110. Here, newly added shortcuts can be incorporated within the translation database 122 and used by the shortcut translator 120 without requiring the user to make any changes to the user-defined shortcuts. Instead, the translation database 122 may update the mappings on the back-end without requiring the user to adjust the mappings. However, the translation database 122 is not limited to a network-accessed database and may include an internal database or other storage that is held within the user system 110 and/or the shortcut translator 120 without accessing a network. In this case, updates to the translation database 122 may be performed by software updates, etc.

Accordingly, when a user enters a command via the keyboard 112 which is intended for the application 130, the shortcut translator 120 may intercept the command, and identify that it is an application-independent shortcut based on tables or other records of information that are stored in the translation database 122. The shortcut translator 120 may detect a software application being used by the user system 110 (e.g., based on a cursor position, etc.) and forward that information along with an ID of the user system 110 to the translation database 122. In response, the translation database 122 may identify that the command being input corresponds to an application-independent shortcut defined by the user of the user system 122. Furthermore, the translation database 122 may convert the command into a native command (e.g., an application-specific shortcut) of the application 130 based on mappings stored in the translation database 122. The mappings may include a mapping between a user-defined application-independent shortcut and a plurality of different applications. Based on the application ID received from the shortcut translator 120, the translation database 122 may know which application-specific shortcut to retrieve.

The shortcut translator 120 may provide a layer of abstraction between the keyboard 112 on the user system 110 and the application 130 where the keyboard commands are being entered. As a result, the user of the user system 110 may use the same application-independent shortcuts for all software tools/applications without regard for the native shortcuts of the application being used. Rather, the shortcut translator 120 may translate the application-independent shortcuts into any of multiple different formats corresponding to multiple different applications based on the application 130 that is being used by the user system 110. As soon as a user has triggered a shortcut, the shortcut translator 120 may recognize the identification of the shortcut and recognize which application the user is currently using. With this contextual information, the shortcut translator 120 can process the entered shortcut and convert it into a shortcut to be understood by the application 130. The shortcut translator 120 then forwards the converted shortcut to the application 130, where it is ultimately executed.

Traditionally, databases are a good way of storing data. A relational database may be particularly suitable here, as it provides not only fast data access but also additional convenience functions. The translation database 122 may provide a central place for storage and access of shortcut mapping information. The translation database 122 may enable easy to find shortcuts due to categorization. Also, the translation database 122 may prioritize shortcuts, provide a fuzzy search, and increase user know-how. In some embodiments, the translation database 122 may learn and internalize new shortcuts and automatically apply a mapping between newly added application-specific shortcuts to a user-defined application-independent shortcut.

The translation database 122 may include lists of shortcuts every software-related application, or as many as are known at the time of development. The result is that the shortcut translator 120 has a one-stop shop for retrieving translation information for shortcuts (i.e., the translation database 122). Due to its convenience functions (i.e. fuzzy search) and the power of a multi-node database, relevant shortcuts may be retrieved by the shortcut translator 120 within a very short time.

Figure 2:
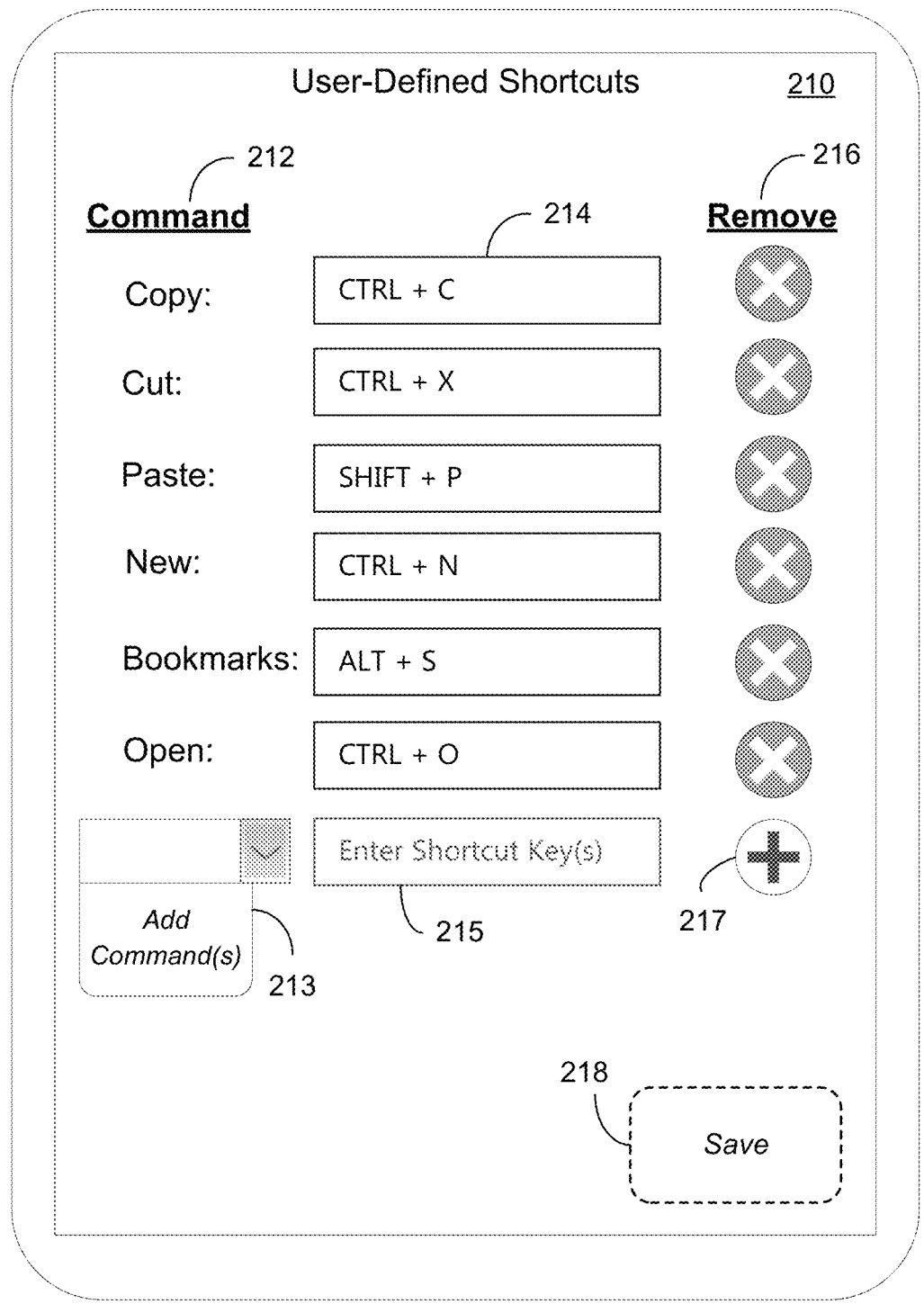
FIG. 2 is a diagram illustrating a user interface for configuring application-independent keyboard shortcuts in accordance with an example embodiment.

FIG. 2 illustrates a user interface 210 displayed via a user device 200 for configuring application-independent keyboard shortcuts in accordance with an example embodiment. For a user to establish a list of application-independent shortcuts (i.e., application-agnostic shortcuts), an initial configuration may be performed via the user interface 210. Furthermore, updates to the shortcuts may be performed at will by the user via the user interface 210. Through the user interface 210, the user may specify which shortcuts the user desires to use through a drop down menu 213 which allows the user to select which commands 212 they which to define. The user-defined application-independent shortcut may then be used for any application programs for the corresponding command.

Referring to the example of FIG. 2, the user interface includes a listing of commands 212 which have been dynamically selected by the user, and key presses 214 associated with the list of commands 212 where keyboard inputs are dynamically defined for the commands 212 by the user. In addition, each dynamically defined shortcut may include a remove button 216 which allows the user to remove a previously defined shortcut. Also, a new shortcut may be created by selecting an add button 217 which causes a drop-down menu 213 to be displayed where a list of pre-defined commands available for selection are stored. Here, a user may choose a command from the drop-down menu 213, enter shortcut keys into the input field 215, and press save button 218 to store the newly defined shortcut/command mapping combination. For example, the save button 218 may cause the new shortcut to be added to the shortcuts of the user already stored in the translation database 122 shown in FIG. 1. Likewise, when a user presses a remove button 216 for removing a command/shortcut mapping combination, the translation database 122 can be updated to remove the command/shortcut mapping by the user pressing the save button 218.

Here, the listing of defined commands 212 is merely an example and is not meant to be exhaustive. Furthermore, not all applications may be able to use all shortcuts. However, if an application has a native shortcut defined for a command, the shortcut translator can map the user-defined shortcut to the native shortcut of the application. In the example of FIG. 2, the user may define shortcuts for any command via the keyboard while typing in keys which are entered as key presses 214. In some cases, the shortcut translator may be connected to the user interface 210 and receive information about the user inputs while configuring the shortcuts. Furthermore, after initial shortcuts have been defined, the user may subsequently access the user interface 210 to modify application-independent shortcuts therefore allowing the user to customize and modify shortcuts over time.

By allowing a user to configure their own shortcuts via the user interface 210, no new standard for shortcuts needs to be introduced. Because of different operating systems, platforms, technologies, stakeholder, parties and of course political discussions, it is highly unlikely that there will ever be a standard for shortcuts. The effort in achieving the same advantages are extremely low than establishing a standard. Through the configuration of application-independent shortcuts via the user interface 210, users can use their own shortcuts. The shortcuts may be some already well known or completely custom shortcuts. Because the user freely decides their own shortcuts, it is very easy for the user to remember and internalize these shortcuts. Furthermore, during the configuration, a list of commands/actions is provided to the user enabling the user to identify more shortcuts which they can configure.

In some embodiments, the user may be prevented from mapping the same shortcut (i.e., combination of key presses) to multiple commands. For example, the shortcut translator may detect that a shortcut is already defined, and cause the attempt by the user to fail. For example, a user may attempt to input the keys CTRL+S for a SAVE command, while the user has already defined the shortcut CTRL+S for a REFRESH command. In this example, the shortcut translator may prevent the user from redundantly using the CTRL+S key press for the SAVE command as well and may output an error message or other notification. In this example, each user-provided shortcut may be unique in the mapping to the commands.

Figure 3:
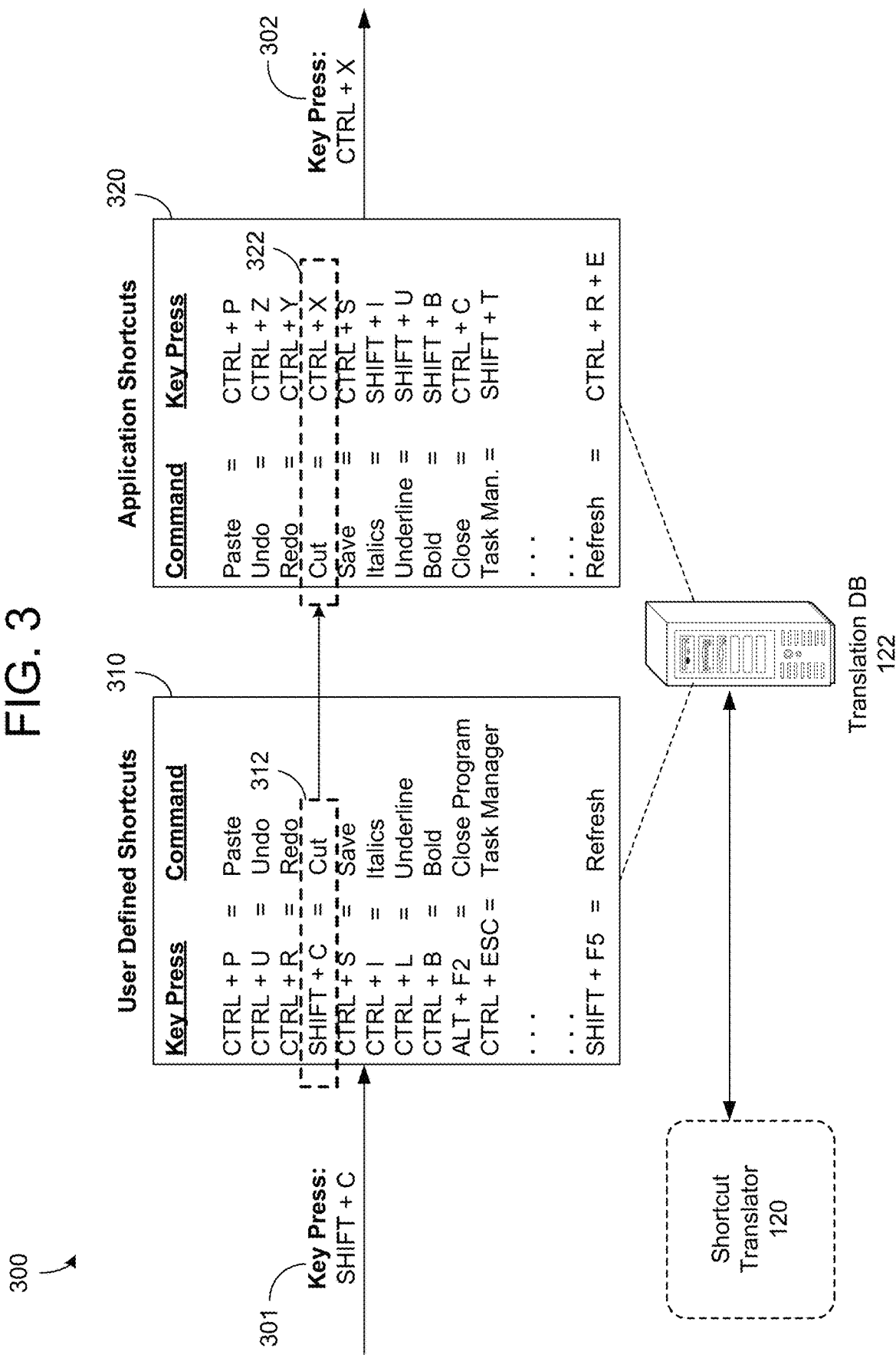
FIG. 3 is a diagram illustrating a process of translating an application-independent shortcut into an application-specific shortcut in accordance with example embodiment.

FIG. 3 illustrates a process 300 of translating an application-independent shortcut into an application-specific shortcut in accordance with example embodiment. The process 300 may be performed by the shortcut translator accessing tables 310 and 320 stored in the translation database. Referring to FIG. 3, the shortcut translator 120 provides a key press 301 (shortcut) detected via a keyboard of a user device. In response, the translation database 122 may identify a command 312 associated with the received key press 301 based on a table 310 of user-defined shortcuts which are paired with commands. Here, the translation database 122 identifies a database entry of command 312 as being associated with the input key press 301. Furthermore, the translation database 122 may identify a corresponding database entry of command 322 that is paired with a different key press in association with the target application based on a table of application shortcuts 320. In this case, the translation database 122 maps the input key press 301 to the target key press 302 by mapping the database entry 312 to a target database entry 322.

After performing the mapping, the translation database 122 may provide the new or replacement key press 302 to the shortcut translator 120. Furthermore, the shortcut translator 120 may forward the replaced key press 302 to the application. In this example, a translation is performed by identifying a command associated with a key press (user-defined shortcut), identifying a corresponding command/ shortcut of the application, and mapping the input key press of the user defined shortcut to an application-specific shortcut of the target application. However, it should be understood that the tables 310 and 320 are not required to perform the shortcut translation process described herein and are merely meant as an example. As another example, the mapping may be performed by mapping the key presses together without the use of a command. In this example, the key presses may be directly mapped. There are also other ways, and the example embodiments should not be construed as being limited to what is shown in the example of FIG. 3.

Figure 4:
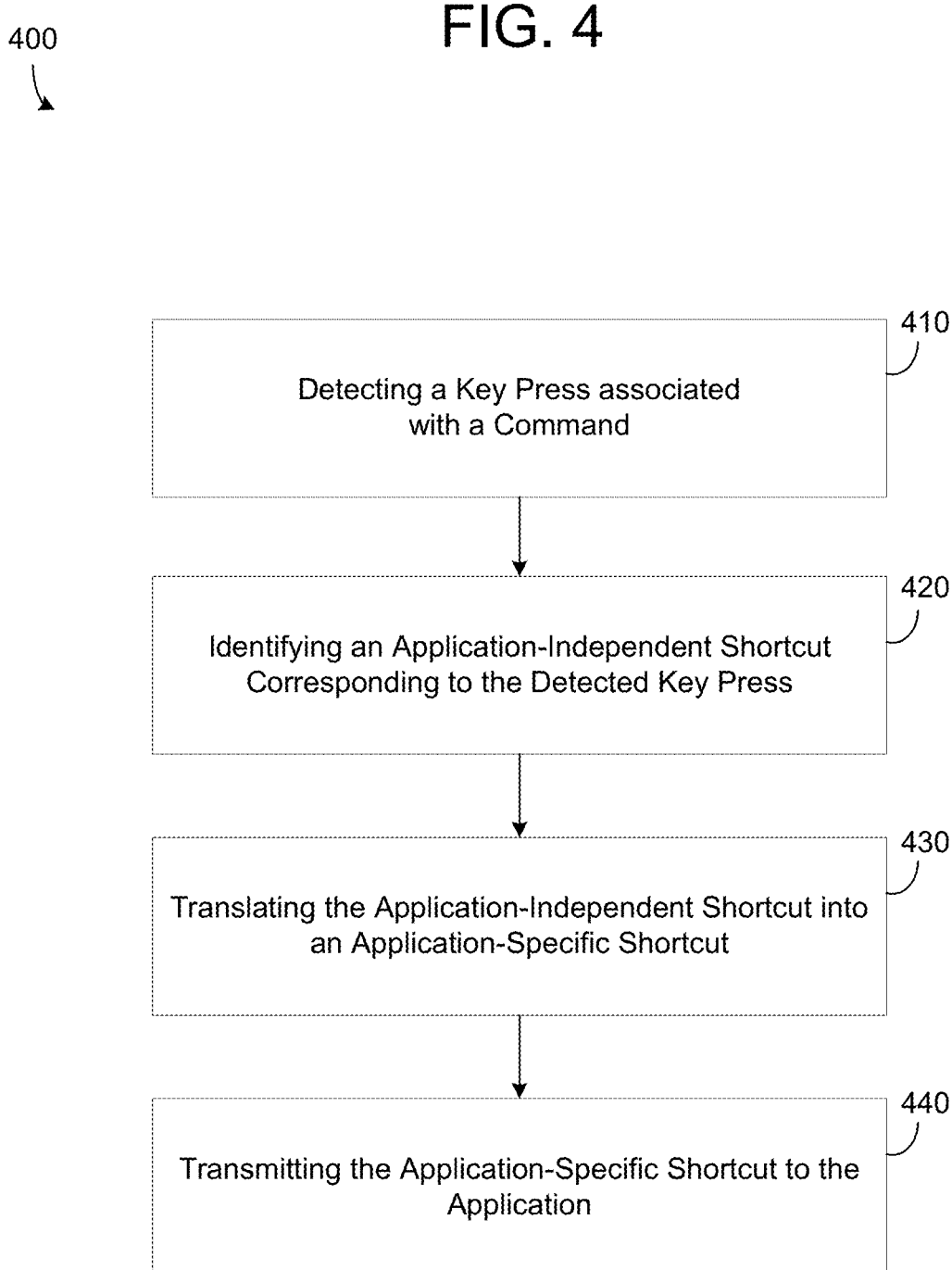
FIG. 4 is a diagram illustrating a method for translating a keyboard shortcut in accordance with an example embodiment.

FIG. 4 illustrates a method 400 for translating an application-independent keyboard shortcut into a software program-specific keyboard shortcut, in accordance with an example embodiment. As an example, the method 400 may be performed by a program installed and executing on a user device which includes a user typing in commands for interaction with a software application. In some embodiments, the software application may also be installed on the user device or it may be remotely hosted by another devices and connected to via a network, etc. Referring to FIG. 4, in 410, the method may include detecting a key press, via a keyboard, associated with a command. For example, the key press may be a combination of keys being pressed in sequential order or simultaneously. The keyboard may be a virtual keyboard displayed on a touch screen of a user device, monitor, appliance, etc., or it may be a mechanical keyboard that is attached to a computer system with a wired or wireless (e.g., Bluetooth, etc.) connection. The command may be a computer command such as a save function, an open function, a cut function, a paste function, a refresh function, or the like. Any command/shortcut combination can be used with the example embodiments.

In 420, the method may include identifying an application-independent shortcut corresponding to the key press. Here, a translation program on the user device may intercept the key press before it is received by an application. The translation program may detect that the key press corresponds to an application-independent shortcut previously defined either by a user or by default (e.g., standardized, universal, etc.). The translation program may access a database which stores a mapping between shortcut presses and application-independent shortcuts. The database may be a local database that is part of the translation program. As another example, the database may be a global database that is stored at a network location (e.g., cloud platform, database, etc.) which is accessible via a network.

In 430, the method may include translating the application-independent shortcut into an application-specific shortcut for performing the command within the application, based on mappings between the application-independent shortcut and application-specific shortcuts stored in the translation database. The application-independent shortcut may include a different combination of keys being pressed than the application-specific shortcut. For example, the translation program may detect and translate a key press (e.g., CTRL+P) defined by the user a paste command into an application-specific key press (e.g., CTRL+V) for a paste command of an application where the key press is being used. In some embodiments, the application may be identified by the translation program based on a location of the user's cursor on the screen, or the like. Meanwhile, the translation information may be obtained from the translation database which stores mappings between the application-independent shortcut and application-specific shortcuts of the different applications for the same command. In some embodiments, the translation database may include a global database that is connected to the translation program on the user device via a network.

Furthermore, in 440, the method may include transmitting the application-specific shortcut to the application in response to the detected key press. Here, the translation program may replace the application-independent shortcut with an application-specific shortcut based on mappings within the database.

According to various embodiments, the application-independent shortcut may be initially configured by a user of the user device via a user interface. Furthermore, the translation database may include a mapping between a plurality of application-independent shortcuts that are either defined by the user (or by default) and a plurality of commands, respectively, which are configured via the user device. In some embodiments, the translation database may include a mapping between the identified application independent shortcut and a plurality of respective application-specific shortcuts for performing the command within a plurality of different applications. Here, the translation program may choose the correct application-specific shortcut based on an application that the user is operating in.

Figure 5:
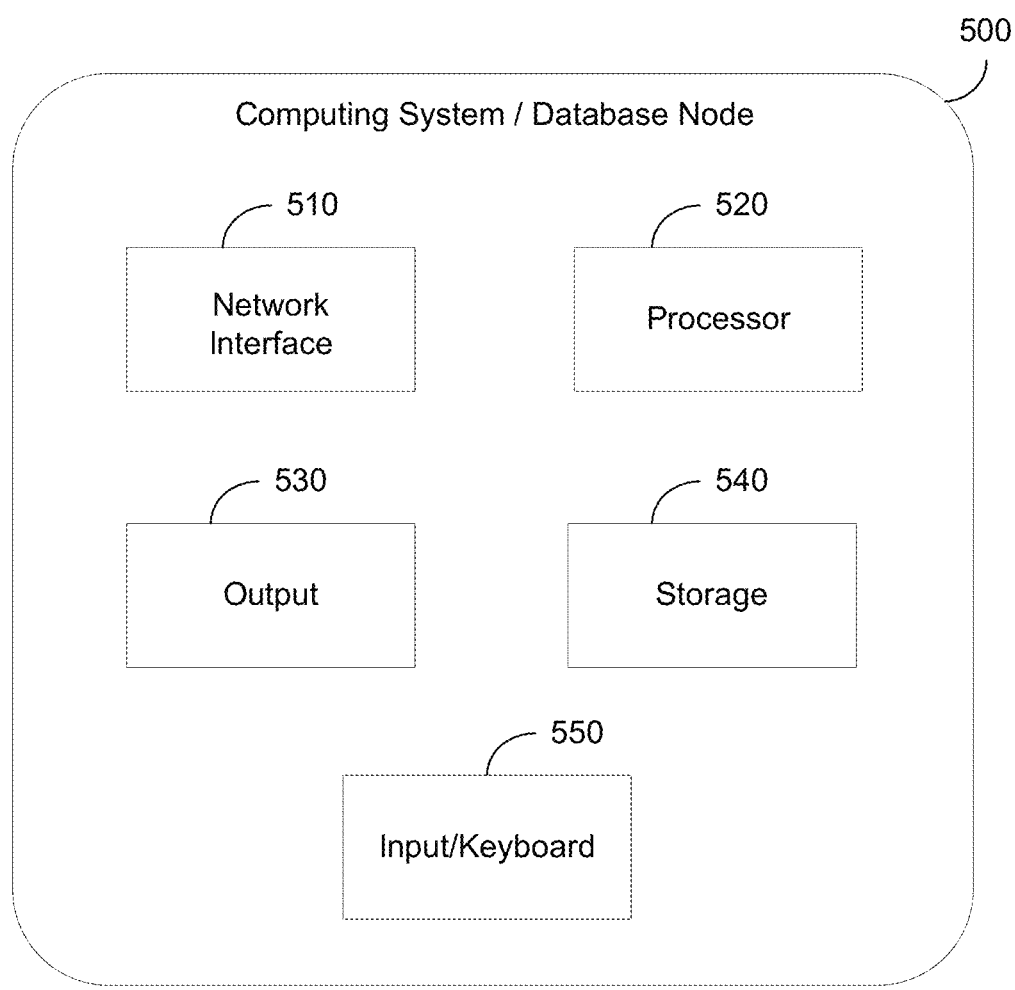
FIG. 5 is a diagram illustrating a computing system in accordance with an example embodiment.

FIG. 5 illustrates a computing system 500 that may be used in any of the embodiments described herein, in accordance with an example embodiment. For example, the computing system 500 may be a user device (e.g., personal computer, laptop, tablet, mobile phone, smart-wearable devices, etc.), a server, a workstation, an appliance, or the like. In some embodiments, the computing system 500 may be distributed across multiple devices. Referring to FIG. 5, the computing system 500 includes a network interface 510, a processor 520, an output 530, a storage device 540 such as an in-memory, and an input unit 550 which may include a keyboard (mechanical, virtual, etc.), and the like. Although not shown in FIG. 5, the computing system 500 may also include or be electronically connected to other components such as a display, a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the computing system 500, an externally connected display, a display connected to the cloud, another device, and the like. For example, the output 530 may include a port, an interface, a cable, a wire, a board, and/or the like, with input/output capabilities. The network interface 510, the output 530, or a combination thereof, may interact with applications executing on other devices.

The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method shown in FIG. 4. According to various embodiments, the storage 540 may store database files and may have a partitioning scheme as shown or described in the examples herein. The storage 540 may include a data store having a plurality of tables, partitions and sub-partitions. The keyboard 550 may receive key presses (in the case of a mechanical keyboard) or detect key presses (in the case of a virtual keyboard). Through the keyboard 550 a user may create a key press that corresponds to a shortcut which instructions the computer to perform a command such as save, delete, open, cut, paste, refresh, and the like.

According to various embodiments, the storage 540 may store information about an application that is executed via the computing system 500. For example, the storage 540 may store instructions which can be read by the processor 520 to execute the application. Examples of applications include, but are not limited to, word processing, spreadsheet, email, integrated development environment (IDE), imaging, editor, and the like. Via the keyboard 550, a user may press a combination of keys (in sequence or simultaneously) which are previously designated as an application-independent shortcut. The application-independent shortcut can cause the software application to execute a command previously linked to the application-independent shortcut.

According to various embodiments, the processor 520 may detect a key press, via the keyboard 550, associated with a command. In response the processor 520 may identify an application-independent shortcut corresponding to the key press. For example, the application-independent shortcut may be set by a user, by default, or the like. In some embodiments, the application-independent shortcut may be part of a larger set of application-independent shortcuts which can be set via a user interface. The processor 520 may translate the application-independent shortcut into an application-specific shortcut for performing the command within the application, based on a translation database.

Furthermore, the processor 520 may transmit the application-specific shortcut to the application in response to the detected key press. In this example, the processor 520 may intercept a generic shortcut command which is designated to a user or a device, and convert the intercepted shortcut key press into an application-specific shortcut key press. Here, the generic shortcut may be used to trigger the same command in multiple different applications because the processor 520 translates the generic shortcut into an application specific shortcut based on the respective application where the user is interacting. In some embodiments, the application-independent shortcut may include a different combination of keys being pressed than the application-specific shortcut. In some embodiments, the application-independent shortcut is initially configured by a user of the user device via a user interface such as shown in FIG. 2.

The translation database may be a network-accessible database (or other storage such as a disk, program, cloud, service, etc.) that is accessed by a translation program running on the computing system 500 via the network interface 510. In this case, the translation database may be controlled at a separate device than the computing system 500. Therefore, updates can be made to the translation database without affecting the user-defined shortcuts. For example mappings between the application-independent shortcut and the list of application-specific shortcuts may be changed without causing a change to the translation program running on the user device. Therefore, a new application can be added to the mappings and the application-independent shortcut can be mapped to a corresponding command of the new application.

In some embodiments, the translation database may include a mapping between a plurality of application-independent shortcuts and a plurality of commands, respectively, which are configured via the user device. In some embodiments, the translation database may include a mapping between the application-independent shortcut and a plurality of respective application-specific shortcuts for performing the command within a plurality of different applications. In some embodiments, the processor 520 may translate the application-independent shortcut based on an application-independent program that is independent from the application on the user device. In some embodiments, the translation database may be a global database connected to the computing system 500 via a network, and the processor 520 may control the network interface 510 to retrieve translation information from the global database for translation of the application-independent shortcut.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A user device comprising:
a translation database storing mappings of a plurality of applications, where each mapping maps application-specific shortcuts of a respective application to a universal set of shortcuts that are application-independent; and
a processor configured to:
intercept a key press intended as input to a target application and identify the target application which the key press is intended for based on a display of the target application on a screen of the user device;
identify an application-independent shortcut from the universal set of shortcuts corresponding to the key press and an application identifier of the target application;
translate the intercepted key press of the application-independent shortcut into a different key press of an application-specific shortcut that is native to the target application where the key press is being input, wherein the different key press of the application-specific shortcut of the target application is retrieved from a mapping that is identified from among the plurality of mappings based on the application identifier of the target application; and
transmit the different key press of the application-specific shortcut to the application in response to the detected key press.

2. The user device of claim 1, wherein the application-independent shortcut comprises a different combination of input keys being pressed on a keyboard than the application-specific shortcut.

3. The user device of claim 2, wherein the keyboard comprises one of a virtual keyboard displayed via a display of the user device and a mechanical keyboard connected to an input port of the user device.

4. The user device of claim 1, wherein the application-independent shortcut is initially configured by a user of the user device via a user interface.

5. The user device of claim 1, wherein the identified mapping comprises a mapping between native key presses of the target application and key presses of a plurality of application-independent shortcuts of the universal set of shortcuts, respectively.

6. The user device of claim 1, wherein the processor is configured to intercept and translate the application-independent shortcut via an application-independent program that is installed on the user device and decoupled from the target application on the user device.

7. The user device of claim 1, further comprising a network interface, wherein the translation database comprises a global database connected to the user device via a network, and the processor is configured to control the network interface to retrieve translation information from the global database for translation of the application-independent shortcut.

8. The computing system of claim 1, wherein the processor detects a native key press of the application-specific shortcut that is paired with the key press of the application-independent shortcut in a table of the translation database that comprises native key presses mapped to application-independent key presses, via commands.

9. The user device of claim 1, wherein the processor is configured to identify the target application which the key press is intended for based on a position of a cursor on the display of the screen of the user device.

10. A method comprising:
storing, via a translation database, mappings of a plurality of applications, where each mapping maps application-specific shortcuts of a respective application to a universal set of shortcuts that are application-independent;
intercepting a key press intended as input to a target application and identifying the target application which the key press is intended for based on a display of the target application on a screen of the user device;
identifying an application-independent shortcut from the universal set of shortcuts corresponding to the key press and an application identifier of the target application;
translating the intercepted key press of the application-independent shortcut into a different key press of an application-specific shortcut that is native to the target application where the key press is being input, wherein the different key press of the application-specific shortcut of the target application is retrieved from a mapping that is identified from among the plurality of mappings based on the application identifier of the target application; and
transmitting the different key press of the application-specific shortcut to the application in response to the detected key press.

11. The method of claim 10, wherein the application-independent shortcut comprises a different combination of input keys being pressed on a keyboard than the application-specific shortcut.

12. The method of claim 11, wherein the keyboard comprises one of a virtual keyboard displayed via the user device and a mechanical keyboard connected to the user device.

13. The method of claim 10, wherein the application-independent shortcut is initially configured by a user of the user device via a user interface.

14. The method of claim 10, wherein the identified mapping comprises a mapping between native key presses of application-specific shortcuts of the target application and key presses of a plurality of application-independent shortcuts of the universal set of shortcuts, respectively.

15. The method of claim 10, wherein the intercepting and the translating is performed via an application-independent program that is installed on the user device and decoupled from the target application on the user device.

16. The method of claim 10, wherein the translation database comprises a global database connected to the user device via a network.

17. A method comprising:
storing, via a translation database, mappings of a plurality of applications, where each mapping maps application-specific shortcuts of a respective application to a universal set of user-defined shortcuts;
intercepting a key press intended as input to a target application and identifying the target application which the key press is intended for based on a display of the target application on a screen of the user device;
identifying a user-defined shortcut from the universal set of user-defined shortcuts corresponding to the key press and an application identifier of the target application;

translating the intercepted key press of the user-defined shortcut into a different key press of an application-specific shortcut that is native to the target application where the key press is being input, wherein the different key press of the application-specific shortcut of the target application is retrieved from a mapping that is identified from among the plurality of mappings based on the application identifier of the target application; and transmitting the different key press of the application-specific shortcut to the application in response to the detected key press.

18. The method of claim 17, wherein the user-defined shortcut comprises a different combination of input keys being pressed on a keyboard than the application-specific shortcut.

19. The method of claim 18, wherein the identified mapping comprises a mapping between native key presses of the target application and key presses of a plurality of user-defined shortcuts of the universal set of shortcuts, respectively.

* * * * *